United States Patent [19]

Mansukhani

[11] 4,196,006

[45] Apr. 1, 1980

[54] JET PRINTING INK

[75] Inventor: Ishwar R. Mansukhani, Neenah, Wis.

[73] Assignee: Whittaker Corporation, Los Angeles, Calif.

[21] Appl. No.: 940,500

[22] Filed: Sep. 8, 1978

[51] Int. Cl.$^2$ ............................................. C09D 11/02
[52] U.S. Cl. ...................................... 106/22; 106/20; 260/DIG. 38
[58] Field of Search .................................. 106/22, 20; 260/DIG. 38

[56] References Cited

U.S. PATENT DOCUMENTS

| | | | |
|---|---|---|---|
| 3,477,862 | 11/1969 | Forsyth, Jr. ............................ | 106/22 |
| 3,889,271 | 6/1975 | Freytag et al. ........................ | 106/22 |

FOREIGN PATENT DOCUMENTS

| | | | |
|---|---|---|---|
| 2622352 | 12/1976 | Fed. Rep. of Germany ............. | 106/22 |
| 50-102507 | 8/1975 | Japan ........................................ | 106/22 |

*Primary Examiner*—Allan Lieberman
*Attorney, Agent, or Firm*—Henry M. Bissell

[57] ABSTRACT

An ink composition for use in jet printing comprising an aqueous solution of a water-soluble dye and a humectant consisting of the internal anhydride of at least one carboxylic acid.

4 Claims, No Drawings

JET PRINTING INK

The invention relates jet ink and particularly an aqueous jet printing ink for printing with a jet ink printing system.

The principle underlying jet printing with ink is based on driving ink through a fine nozzle of metal or glass, so that uniform ink droplets are ejected from the nozzle tip. These ink droplets are electrostatically deflected with a deflecting electrode, arranged in front of the nozzle, so that symbols are printed with a preliminarily determined matrix. In this printing process the ink in the nozzle is divided in fine ink droplets and the direction of the ink jet is controlled by deflecting plates or through nozzle movement. This printing process is highly dependent on the properties of the ink. The ink must be capable of forming stable ink droplets under pressure and under an electrical field, which have a high deflection sensitivity. Further, the ink must readily emerge from the nozzle. In addition, clogging of the nozzle by drying ink must be prevented. Commercial nozzle jet inks are divided in aqueous and nonaqueous inks. Nonaqueous inks have the disadvantage of low stability ink droplets because of low surface tension. As a result, while in flight the ink droplets form a fog. In addition, such a nonaqueous ink has a high electrical resistance and a low deflecting sensitivity. At the same time, these ink droplets are particularly unstable under a high electrical charge. Consequently, it has been difficult to print clear and distinct symbols with this method.

The concepts of the present invention reside in a new and improved ink composition suitable for use in jet printing comprising an aqueous solution of a water-soluble dye and a humectant consisting of the internal anhydride of at least one carboxylic acid. The internal anhydride of at least one carboxylic acid include the lactones of fatty acids, the lactones of alicyclic acids, the lactones of acetylenic acids, and the lactones of aromatic acids. The preferred lactone is butyrolactone.

It has been found that printing inks formulated in accordance with this invention have the desired viscosity for use in jet printing, and that the viscosity of the composition is subject to little variation with use as water is lost by evaporation during recirculation of the ink composition through the jet printer. In addition, the humectant of this invention substantially prevents or minimizes tip drying of the printing ink in the orifice or nozzle during down time of the printer, such as when the printer is shut down over night.

The total amount of the humectant mixture employed in the ink composition of the present invention can be varied within wide limits as dictated by the viscosity considerations of the ink composition.

As the coloring material in the ink composition of the invention, use should be made of a water-soluble dye or mixture of dyes. The use of pigments or other forms of particulate matter is preferably avoided since such materials tend to clog the very small orifice of the jet printer.

Preferred dyes of the present invention are the commercially available direct dyes which generally contain an ionizable inorganic salt, such as Glauber salts, or sodium chloride which has been added during manufacture in order to standardize the dye lot. The inorganic material thus renders the dye conductive whereby the ink jet is capable of being deflected in an electromagnetic field during jet printing. Such direct dyes are well known to those skilled in the art and are commercially available, as represented by the C.I. direct black 38 dyes (e.g., capable of being deflected in an electromagnetic field Direct Black GW marketed by the Tenneco Color Division of Tenneco Chemicals and Capamine Black ESA marketed by the Capital Color and Chemical Co.). Such dyes are available in a number of colors, any one or more of which can be used in the practice of the invention. If use is made of a pure dye containing no ionizable salt, the desired conductivity can be achieved by adding 0.5% ionizable salt, such as one of the types described, to the composition. For a further description of such well known dyes, reference can be made to the Color Index, published by the Society of Dyes and Colorists in cooperation with the American Association of Textile Chemists and Colorists (1957).

The ink composition of the present invention can be prepared by thoroughly mixing the components to insure uniform mixing and complete dissolution of the water-soluble dye, and then filtering the resulting composition to remove any particulate contamination. As will be apparent to those skilled in the art, filtration of the composition after mixing the components is highly desirable in order to remove from the ink composition particulate matter, such as contamination or undissolved dye, which might otherwise serve to clog or obstruct the jet of a jet printer during use. It is frequently preferred to filter the composition of the invention to remove particulate matter having a diameter greater than 2 microns, and preferably 1 micron, to insure that obstruction of the jet of the jet printer will be avoided.

The invention is described in the following on the basis of exemplified embodiments.

While there are disclosed below but a limited number of embodiments of the invention herein presented, it is possible to produce still other embodiments without departing from the inventive concepts herein disclosed. Various other modifications will be readily apparent to those skilled in the art.

The following novel composition is expressed in parts by weight:

EXAMPLE 1

| | |
|---|---|
| Telon Fast Black LD Liquid 33 | 50.0 |
| Butyrolactone | 150.0 |
| Distilled water | 50.0 |
| | 250.0 |

What is claimed is:

1. In a process for information recording comprising producing a fine jet of colored aqueous liquid, directing the jet of colored liquid onto a recording medium, modulating the density of the applied jet by an electric field in accordance with the information to be recorded, the improvement comprising the presence as a humectant an effective amount of the internal anhydride of at least one carboxylic acid selected from the group consisting of fatty acids, acetylenic acids, alicyclic acids and aromatic acids.

2. The process of claim 1 wherein said internal anhydride of at least one carboxylic acid is butyrolactone.

3. An ink composition for use in jet printing comprising an aqueous solution of a water-soluble direct dye and a humectant consisting of an effective amount of the internal anhydride of at least one carboxylic acid selected from the group consisting of fatty acids, acetylenic acids, alicyclic acids and aromatic acids.

4. The composition of claim 3 wherein said internal anhydride is butyrolactone.

* * * * *